(12) United States Patent
Ogawa et al.

(10) Patent No.: US 7,090,365 B2
(45) Date of Patent: Aug. 15, 2006

(54) BACKLIGHT UNIT HAVING AN INCLINED LIGHT EMISSION SURFACE

(75) Inventors: Toshihisa Ogawa, Kawasaki (JP); Shin-ichirou Ono, Kawasaki (JP)

(73) Assignee: NEC LCD Technologies, Ltd. (JP)

( * ) Notice: Subject to any disclaimer, the term of this patent is extended or adjusted under 35 U.S.C. 154(b) by 89 days.

(21) Appl. No.: 10/970,737

(22) Filed: Oct. 21, 2004

(65) Prior Publication Data

US 2005/0099793 A1 May 12, 2005

(30) Foreign Application Priority Data

Nov. 6, 2003 (JP) .............................. 2003-376749

(51) Int. Cl.
*G02F 1/1335* (2006.01)

(52) U.S. Cl. .................. 362/29; 362/561; 362/560; 362/97; 362/240; 362/252; 362/27; 362/246; 362/606; 362/607; 362/612; 362/613; 362/614; 362/616; 362/617; 362/618; 349/70; 315/500

(58) Field of Classification Search ................ 362/31, 362/561, 560, 97, 240, 252, 246, 606, 607, 362/612, 613, 614, 616, 617, 618; 315/500; 349/70

See application file for complete search history.

(56) References Cited

U.S. PATENT DOCUMENTS

| | | | | |
|---|---|---|---|---|
| 6,633,722 B1 * | 10/2003 | Kohara et al. | ............... | 385/146 |
| 6,964,489 B1 * | 11/2005 | Blume et al. | .................. | 362/27 |
| 7,009,681 B1 * | 3/2006 | Shinoda | ....................... | 355/53 |
| 2005/0140847 A1* | 6/2005 | Jeon | ............................ | 349/62 |

FOREIGN PATENT DOCUMENTS

| | | |
|---|---|---|
| JP | 2000-010094 | 1/2000 |
| JP | 2000-338483 | 12/2000 |

* cited by examiner

*Primary Examiner*—Renee Luebke
*Assistant Examiner*—Mary Zettl
(74) *Attorney, Agent, or Firm*—Hayes Soloway P.C.

(57) ABSTRACT

A backlight unit includes front and rear emission surfaces and a plurality of lamps arranged in the central plane of the backlight unit, wherein the front and rear emission surfaces are inclined by $+\theta$ and $-\theta$ degrees with respect to the central plane. The pitch of the lamps increases along the direction in which the distance between the emission surface and the central plane increases.

11 Claims, 9 Drawing Sheets

BACKLIGHT UNIT HAVING AN INCLINED LIGHT EMISSION SURFACE

BACKGROUND OF THE INVENTION (a) Field of the Invention

The present invention relates to a backlight unit having an inclined light emission surface and, more particularly, to a backlight unit having an inclined light emission surface and a plurality of lamps behind the light emission surface. The present invention also relates to a double-sided display device including the backlight unit.

(b) Description of the Related Art

A backlight unit is a surface-emission light source generally used in a LCD (liquid crystal display) device. The backlight unit has an emission surface on a scattering plate for scattering the light emitted by the lamps disposed therein. The backlight units are categorized into two types: an edge-lamp backlight unit including a pair of lamps disposed in the vicinities of both edges of the scattering plate; and a parallel-lamp backlight unit including a plurality of parallel lamps disposed behind the scattering plate. The parallel-lamp backlight unit has the advantages of a larger light emission area and an increased luminance of the light emission surface compared to the edge-lamp backlight unit. Patent Publication JP-A-2000-10094, for example, describes a parallel-lamp backlight unit.

A variety of LCD devices have been used in a variety of applications heretofore, including a double-sided LCD device having a pair of LCD panels on the front and rear sides thereof. The double-sided LCD device generally includes therein a double-sided backlight unit used in common for the front and rear screens. A double-sided, parallel-lamp backlight unit is described in JP-A-2000-338483, for example.

FIG. 7 shows an LCD device including a double-sided, parallel-lamp backlight unit (hereinafter, may be referred to simply as double-sided backlight unit) and described in JP-A-2000-338483. The double-sided backlight unit 200 has a pair of scattering plates 201 supported parallel to one another by a pair of support spacers 203, and a plurality of lamps 202 extending parallel to one another in a row or array on the central plane 204 between the scattering plates 201. The backlight unit 200 is associated with front and rear LCD panels 205 disposed on the respective scattering plates 201.

The number of parallel lamps 202 as well as the pitch "P" thereof is determined based on the luminance requested of the light emission surface of the backlight unit 200. The pitch "P" of the parallel lamps 202 is generally constant within the backlight unit 200 for achieving a uniform luminance over the emission surface.

The double-sided LCD device may be disposed in a train or pathway over the eyes of passengers or passersby for an advertisement by displaying a good etc. on both the front and rear screens. In such a case, these screens should be preferably inclined from the vertical planes to be directed slightly downward. On the contrary, the screens of the double-sided LCD device should be preferably inclined from the vertical planes to be directed slightly upward if the screens are disposed below the eyes of an observer.

It is noted that both the screens of the double-sided LCD device cannot be directed, for example, downward concurrently because both the screens are fabricated as an integral body.

FIG. 8 shows a conceivable double-sided LCD device including a pair of LCD panels 205 and a backlight unit 200a having front and rear scattering plates 201, which may be directed downward at the same time. In this structure of the backlight unit 200a, both the emission surfaces are inclined by angle +θ, with respect to the central plane 204 of the backlight unit 200a, in the opposite directions and thus disposed in symmetry with each other with respect to the central plane 204. The double-sided LCD device having the double-sided backlight unit 200a provides a suitable viewing angle for the observers observing the front and rear screens of the LCD device, if the LCD device is hanged from the ceiling, with the large-thickness side of the LCD device being disposed at the top side.

In the structure of the backlight unit 200a shown in FIG. 8, the distance between the scattering plate 201 and the lamps 202 depends on the location in the y-direction. It is to be noted that a smaller distance between the scattering plate 201 and the lamps 202 provides a higher luminance on the screen of the LCD panel 205. That is, the backlight unit 200a shown in FIG. 8 has a disadvantage in that the luminance varies along the y-direction on both the front and rear emission surfaces.

The above disadvantage does not arise in a single-sided backlight unit so long as the direction of the array of lamps is inclined in accordance with the inclined screen of the LCD device. However, as in the case of the LCD unit shown in FIG. 9, if there is a limitation due to the structure or arrangement of the LCD device such that the array of the lamps 202 in the backlight unit 200b cannot be inclined in accordance with the inclined screen of the LCD panel 205, a similar problem will arise in the case of the single-sided backlight unit 200b.

SUMMARY OF THE INVENTION

In view of the above problem in the conventional technique, it is an object of the present invention to provide a backlight unit having an inclined emission surface and an improved uniformity in the luminance of the emission surface.

It is an additional object of the present invention to provide a display device, such as an LCD device, having an improved luminance uniformity on the front and rear emission surfaces.

The present invention provides, in a first aspect thereof, a backlight unit including a light emission surface, and a plurality of lamps arranged in a radiation plane in a direction inclined with respect to said light emission surface, said plurality of lamps being arranged so that a pitch between each adjacent two of said lamps reduces along a direction in which a distance between said radiation plane and said emission surface increases due to said inclination.

The present invention also provides, in a second aspect thereof, a backlight unit including a light emission surface, and a plurality of lamps arranged in a radiation plane in a direction inclined with respect to said light emission surface, said plurality of lamps having radiation powers such that said radiation power increases along a direction in which a distance between said radiation plane and said emission surface increases due to said inclination.

The present invention also provides, in a third aspect thereof, a backlight unit including a light emission surface, a plurality of lamps arranged in a radiation plane in a direction inclined with respect to said light emission surface, and a transmission control film having a transmission control pattern wherein a transmission of said transmission control pattern increases along a direction in which a distance between said radiation plane and said emission surface increases due to said inclination.

The present invention also provides, in a fourth aspect thereof, a double-sided display device including a double-sided backlight unit according to an embodiment of the present invention.

In accordance with the backlight unit of the present invention, the backlight unit has a uniform luminance over the emission surface thereof due to the structures of the arrangement or structure of the lamps etc. irrespective of the difference in the distance between the lamp and the emission surface, while providing a suitable viewing angle for the observer of the screen of the display panel.

The above and other objects, features and advantages of the present invention will be more apparent from the following description, referring to the accompanying drawings.

PREFERRED EMBODIMENT OF THE INVENTION

Figure 1:
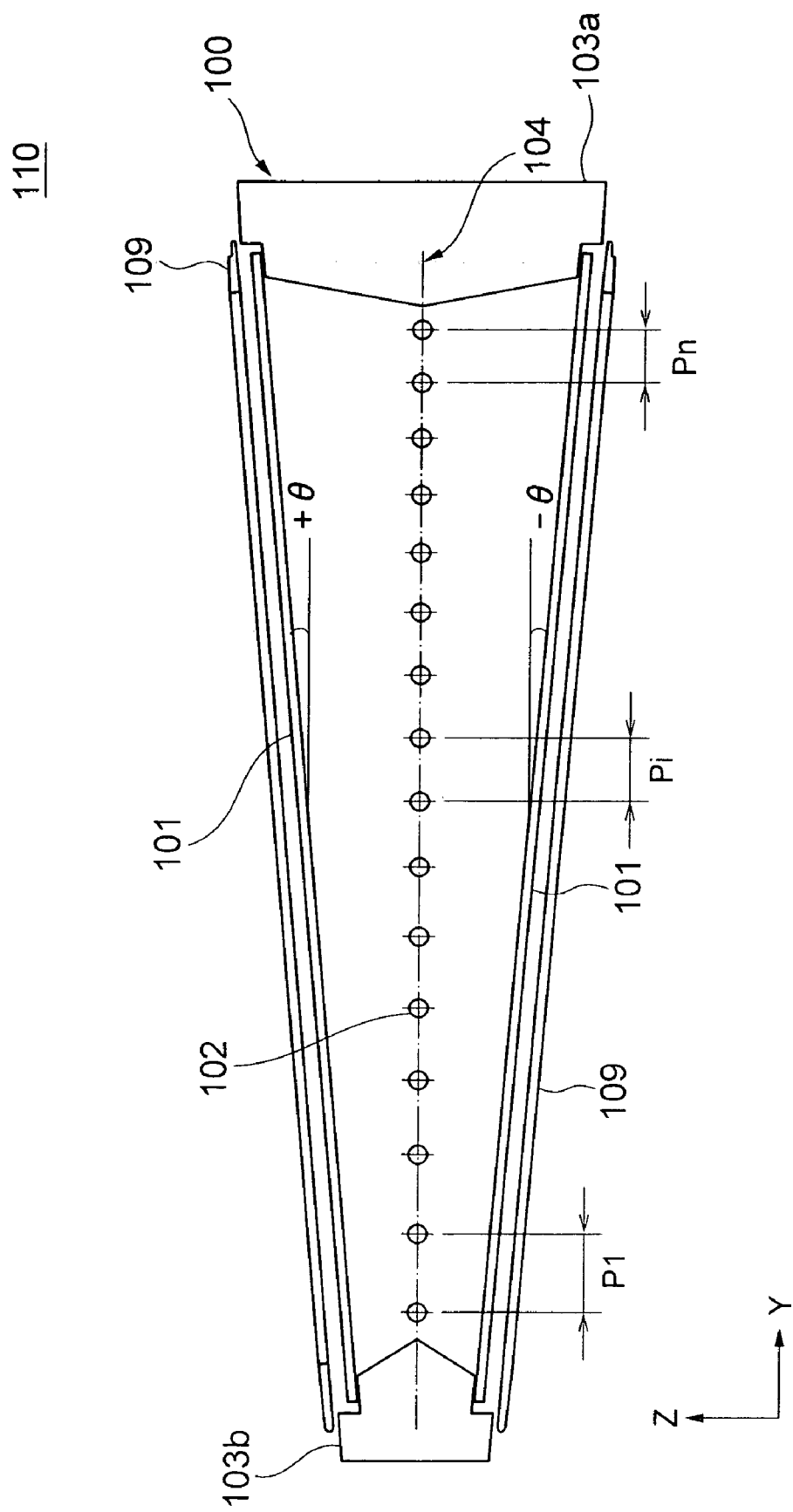
FIG. 1 is a sectional view of an LCD device including a backlight unit according to a first embodiment of the present invention.

Now, the present invention is more specifically described with reference to accompanying drawings, wherein similar constituent elements are designated by similar reference numerals.

Referring to FIG. 1, an LCD device, generally designated by numeral 110, includes front and rear LCD panels 109, and a backlight unit 100 according to a first embodiment of the present invention. The backlight unit 100 is implemented as a double-sided backlight unit, which includes front and rear scattering plates 101 having light emission surfaces and disposed adjacent to the front and rear LCD panels 109, respectively.

The thickness of the backlight unit 100, that is, the distance between the emission surface of the front scattering plate 101 and the emission surface of the rear scattering plate 101 in the backlight unit 100, is larger at the right edge thereof than at the left edge thereof as viewed in the drawing. Both the LCD panels 109 are disposed on and parallel to the respective scattering plates 101. In these configurations, the LCD device 110 has suitable inclined screens on the LCD panels 109, suited to eyes of both front and rear observers, if it is hanged from the ceiling with the large-thickness edge (right edge) being the top side. It is to be noted that, in this case, the y-direction corresponds to a scanning direction of the LCD device 110.

The backlight unit 100 has a symmetric structure with respect to the central plane 104 of the backlight unit 100 extending in the y-direction. More specifically, the front scattering plate 101 configuring the front emission surface has an inclined angle +θ with respect to the central plane 104 whereas the rear scattering plate 101 configuring the rear emission surface has an inclined angle −θ with respect to the central plane 104. The inclined angle θ is set in the range between 1 degree and 3 degrees, for example. For this purpose, the support spacer 103a defining the large-thickness edge has a thickness larger than the thickness of the support spacer 103b defining the small-thickness edge.

The parallel lamps 102 are implemented by cold-cathode ray tubes each having a diameter of 3 mm, for example, and arranged in an array or row on the central plane 104. The distance between the scattering plate 101 and the left-most lamp 102 in the vicinity of the small-thickness edge is set at 10 mm, for example. The lamp pitch, or the distance between each adjacent two of the parallel lamps 102, is larger in the vicinity of the small-thickness edge than in the vicinity of the large-thickness edge, as depicted in the drawing by the structure wherein P1>Pi>Pi+1>Pn (i=2, 3, . . . n−2). This structure achieves a uniform luminance on the surfaces of both the front and rear scattering plates 101.

Figure 2:
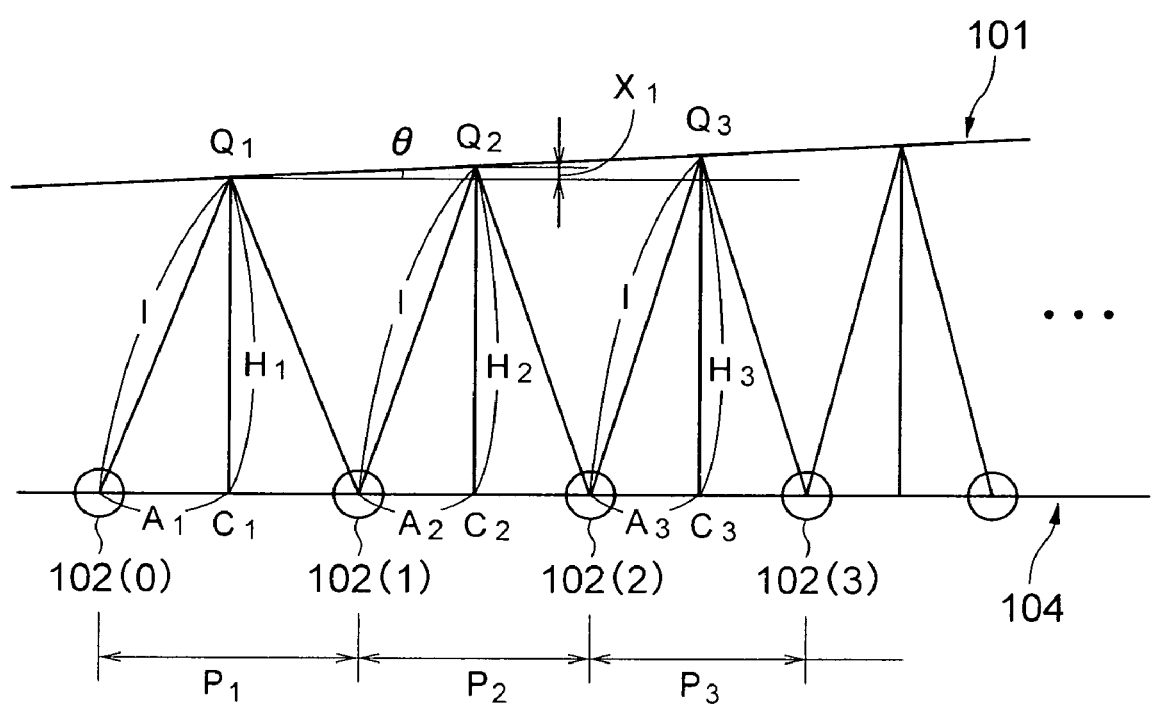
FIG. 2 is an enlarged, partial sectional view of the backlight unit of FIG. 1, showing the dimensions therein.

FIG. 2 shows the detail of the lamp pitch determined on the backlight unit of FIG. 1. The sequential numbers of the lamps 102 and corresponding points Q are determined in the order from the small-thickness edge toward the large-thickness edge of the backlight unit 100 in this example.

The lamp pitch is determined on the cross section of the lamps in FIG. 2 so that the distance "l" between the center of each lamp 102(0), 102(1), . . . and the corresponding point Q1, Q2, . . . is equal to the distance between the center of the adjacent lamp 102(1), 102(2), . . . and the corresponding point Q2, Q3, . . . the each corresponding point Q1, Q2, . . . being an intersection at which the middle line C1-Q1, C2-Q2, . . . between the corresponding lamp 102(0), 102(1), . . . and the adjacent lamp 102(1), 102(2), . . . intersects the emission surface of the scattering plate 101. The corresponding point Q1, Q2, . . . is obtained by the technique described hereinafter.

First, the first lamp pitch P1 between the zero-th lamp 102(0) and the first lamp 102(1), which is equal to twice the distance $A_1$ between the center of the zero-th lamp 102(0) or first lamp 102(1) and the middle point C1 between these lamps 102(0) and 102(1) is arbitrarily determined. This determines the distance $H_1$ between the middle point C1 and the first point Q1 corresponding to the zero-th lamp 102(0). Then, the distance "l" between the zero-th lamp 102(0) and the corresponding point Q1 is obtained by the following formula:

$$l = \sqrt{H_1^2 + A_1^2}. \tag{1}$$

The second lamp pitch $H_2$ between the first lamp 102(1) and the second lamp 102(2) is determined by the following relationship:

$$H_2 = \sqrt{l^2 - A_2^2} = \sqrt{(H_1^2 + A_1^2) - A_2^2}. \tag{2}$$

Letting $x_1$ be $x_1=H_2-H_1$, the second point Q2 is obtained from the fact that the point Q2 lies on the surface of the scattering plate 101, as follows:

$$H_2=H_1+x_1=H_1+(A_1+A_2)\times\tan\theta \qquad (3).$$

After arbitrarily determining the first lamp pitch $P_1$ and the inclined angle $\theta$ of the scattering plate 101, the distance $A_2$ is determined from the formula (2) and the formula (3), the distance $A_2$ multiplied by two providing the second pitch $P_2$. The next pitches $P_i$ ($P_3$, $P_4$, ...) can be obtained similarly to this procedure from the previous pitch $P_{i-1}$ and the inclined angle $\theta$ of the scattering plate 101, thereby providing the group of points wherein the distance between the center of lamp 102(2), 102(3), ... and the corresponding point Q3, Q4, ... is constant for any of the parallel lamps 102.

In the above configuration of the present embodiment, the lamp pitch is larger in the area corresponding to the smaller distances between the lamps and the scattering plates than in the area corresponding to the larger distances between the lamps and the scattering plates. This provides a uniform luminance on the emitting surface of the backlight unit 100. The LCD device 110 having such a backlight unit 100 achieves a uniform luminance on the screen of the LCD panels 109, while providing an optimum inclined angle to the front and rear observers.

The above configuration wherein the distance between the lamp 102(i) and the corresponding point $Q_{i+1}$ is constant for any of the parallel lamps 102 allows the intensity of light received from a pair of lamps 102(i) and 102(i+1) disposed on both sides of the point $Q_{i+1}$ to be constant for any of the points $Q_{i+1}$. The constant intensity of light achieves a substantially uniform luminance on the emission surface.

Figure 3:
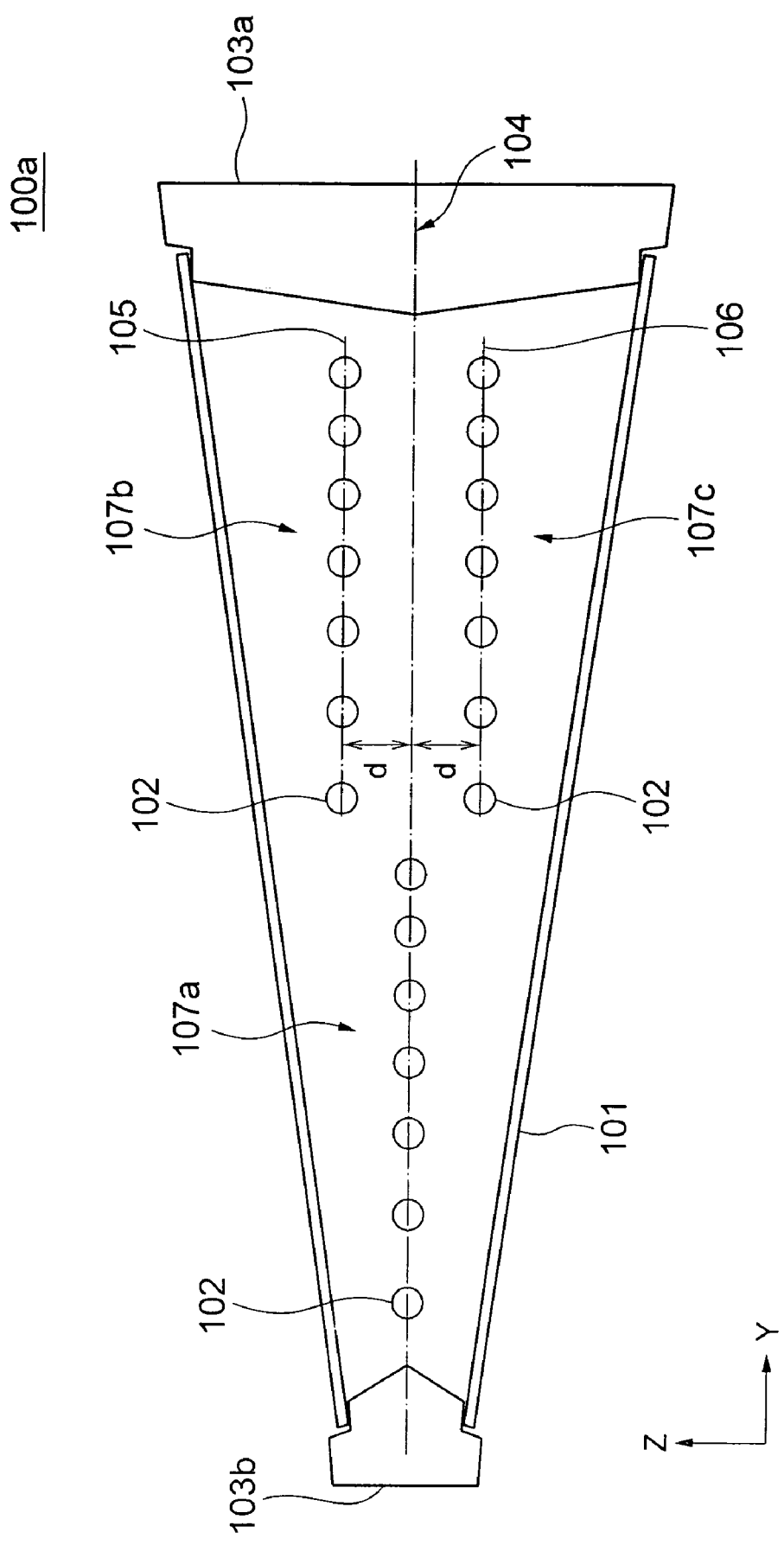
FIG. 3 is a sectional view of a backlight unit according to a second embodiment of the present invention.

FIG. 3 shows a backlight unit according to a second embodiment of the present invention. The backlight unit 100a of the present embodiment is similar to the first embodiment except that the parallel lamps 102 are disposed in a plurality of rows in the present embodiment.

More specifically, the lamps 102 in the backlight unit 100a include a first group 107a of lamps arranged in a first row lying on the central plane 104, a second group 107b of lamps arranged in a second row deviated from the central plane 104 by a distance "d" toward the front scattering plate 101, and a third group 107c of lamps arranged in a third row deviated from the central plane 104 by a distance "d" toward the rear scattering plate 101, the second row being in symmetry with the third row with respect to the central plane 104 of the backlight unit 100a.

The first lamp group 107a is disposed in the first half area of the backlight unit 100a near the small-thickness edge thereof, whereas the second and third lamp groups 107b and 107c are disposed in the second half area of the backlight unit 100a near the large-thickness edge thereof.

The first lamp group 107a irradiates the front and rear scattering plates 101, the second lamp group 107b mostly irradiates the front scattering plate 101, and the third lamp group 107c mostly irradiates the rear scattering plate 101. The distance between the leftmost lamp 102 of the first group 107a and the scattering plate 101 is substantially equal to the distance between the leftmost lamp 102 of the second lamp group 107b or the third lamp group 107c and the nearby scattering plate 101.

In each lamp group, the pitch of the parallel lamps 102 is larger in the area corresponding to the small-thickness portion of the backlight unit 100a than in the area corresponding to the large-thickness portion of the backlight unit 100a. The arrangement of the lamps 102 in each lamp group 107a, 107b or 107c is similar to that in another lamp group.

It is considered in the second embodiment that a larger inclined angle of the scattering plate 101, if adopted in the first embodiment, may involve a lower luminance on the scattering plate due to a larger distance between the scattering plate and the lamps 102, especially in the area near the large-thickness edge of the backlight unit 100a, thereby causing ununiform luminance on the scattering plate 101. The configuration of the second embodiment assures a higher luminance due to the smaller distance between the lamps 102 and the scattering plate 101 even in the case of a higher inclined angle, thereby achieving a uniform luminance.

Figure 4:
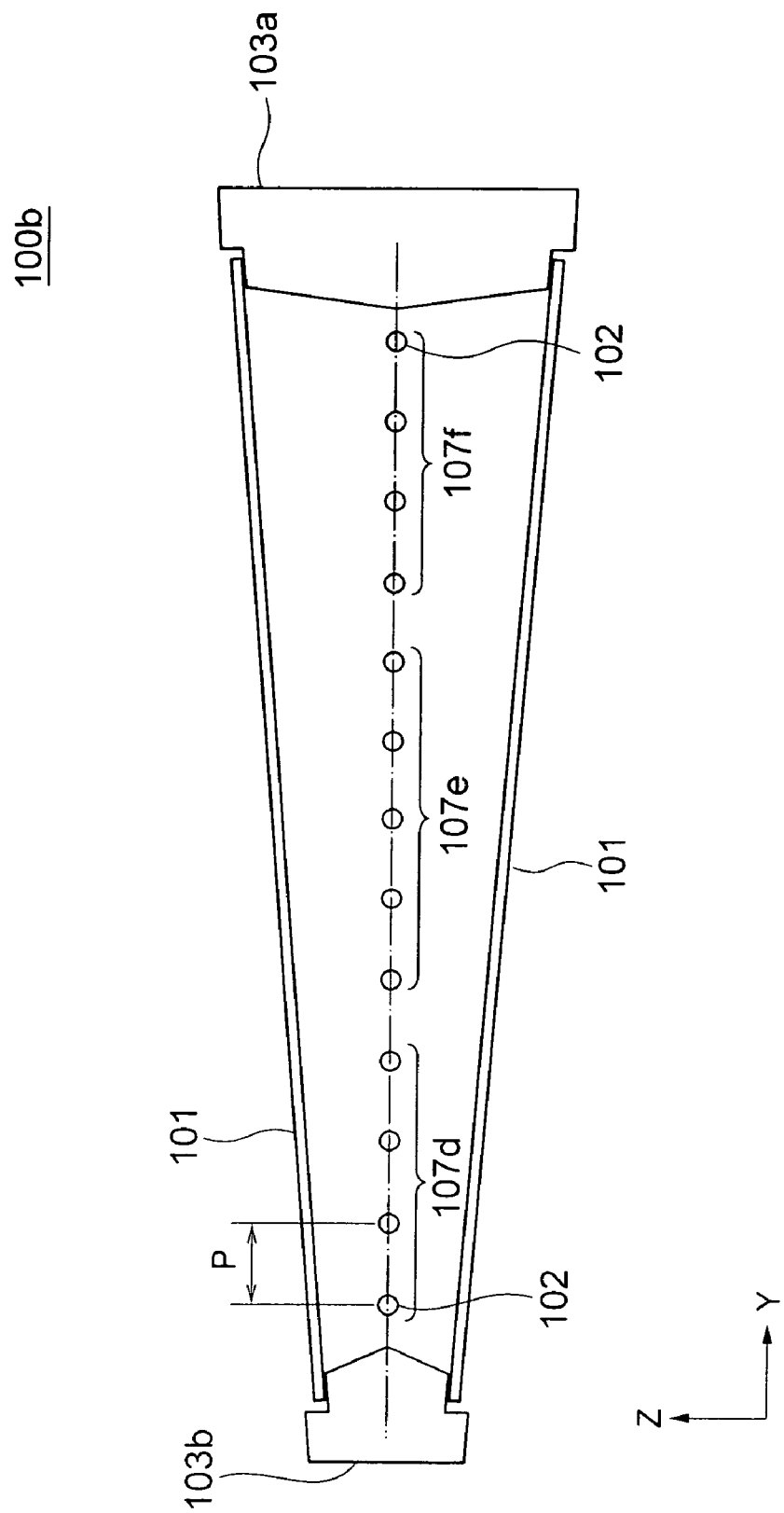
FIG. 4 is a sectional view of a backlight unit according to a third embodiment of the present invention.

FIG. 4 shows a backlight unit according to a third embodiment of the present invention. The third embodiment is similar to the first embodiment except that the lamps 102 having different radiation powers are disposed at a constant pitch "P" in the third embodiment. More specifically, the lamps 102 include a first group 107d of lamps having a lower radiation power disposed in the vicinity of the small-thickness edge of the backlight unit 100b, a second group 107e of lamps having a middle radiation power and disposed in the central area, and a third group 107f of lamps having a higher radiation power and disposed in the vicinity of the large-thickness edge. The radiation power can be controlled by changing the current flowing through the lamps 102 or the voltage applied across the lamps 102.

In an alternative of the third embodiment, the radiation power of each lamp 102 may be controlled linearly with respect to the distance between the scattering plate 101 and the each lamp 102, for achieving a higher uniformity of the luminance.

Figure 5:
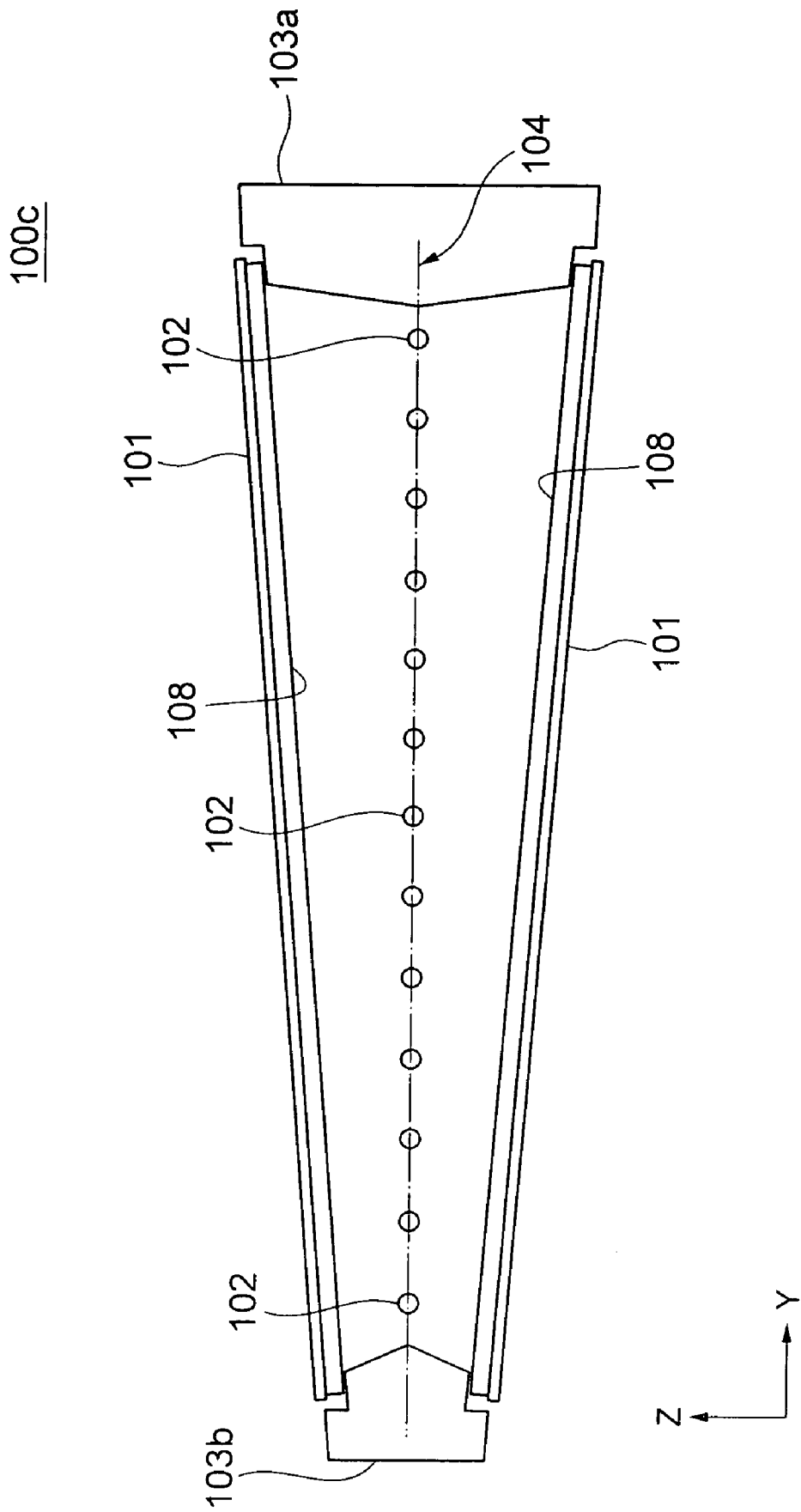
FIG. 5 is a sectional view of a backlight unit according to a fourth embodiment of the present invention.

FIG. 5 shows a backlight unit 100c according to a fourth embodiment of the present invention. The fourth embodiment is similar to the third embodiment except that a light shield film 108 is adhered onto the inner surface of the scattering plate 101 in the present embodiment instead of arranging lamps 102 having different radiation powers. The light shield film 108 has a specific light shield pattern, wherein the amount (ratio) of light passing therethrough is smaller in the area near the small-thickness edge of the backlight unit 100c than in the area near the large-thickness edge. The light shield pattern may be obtained by arranging a large number of clear dot patterns on a film having a light shield function, wherein the size of the dot patterns or the density of the dot patterns having the same size is controlled along the y-direction. The light shield pattern may be obtained instead by arranging dark dot patterns on a transparent film.

Although the above embodiments are described in connection with the double-sided backlight units, the present invention can be also applied to a single-sided backlight unit having an inclined scattering plate inclined with respect to the row of lamps.

It is to be noted that the configurations of the above embodiments may be combined with that of one another. For example, the first embodiment and the third embodiment may be combined with each other, to obtain a configuration wherein the lamp pitch is reduced and a larger radiation power is employed along with the increase of the distance between the scattering plate and the lamp.

Figure 6:
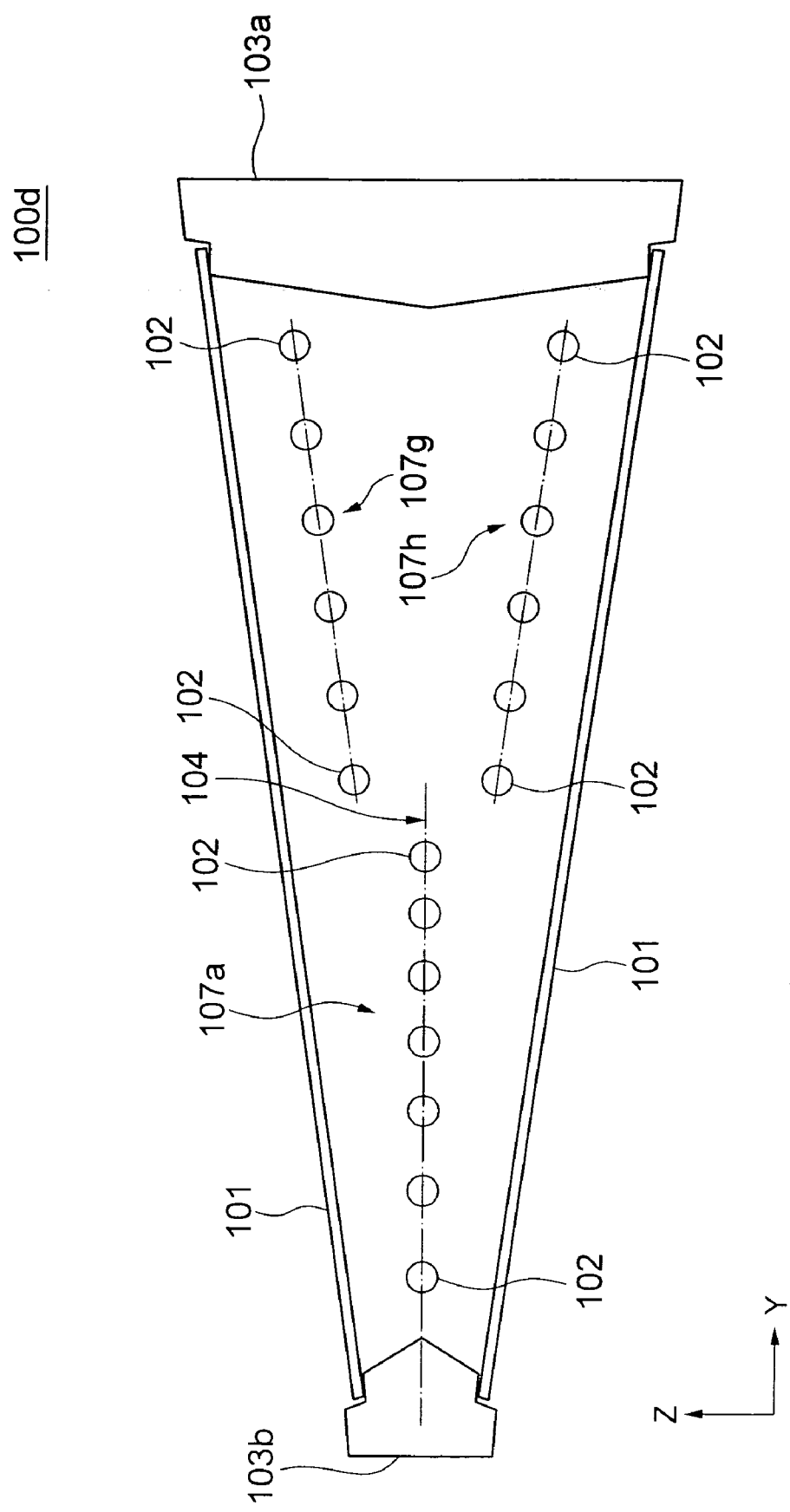
FIG. 6 is sectional view of a backlight unit according to a fifth embodiment of the present invention.
Figure 7:
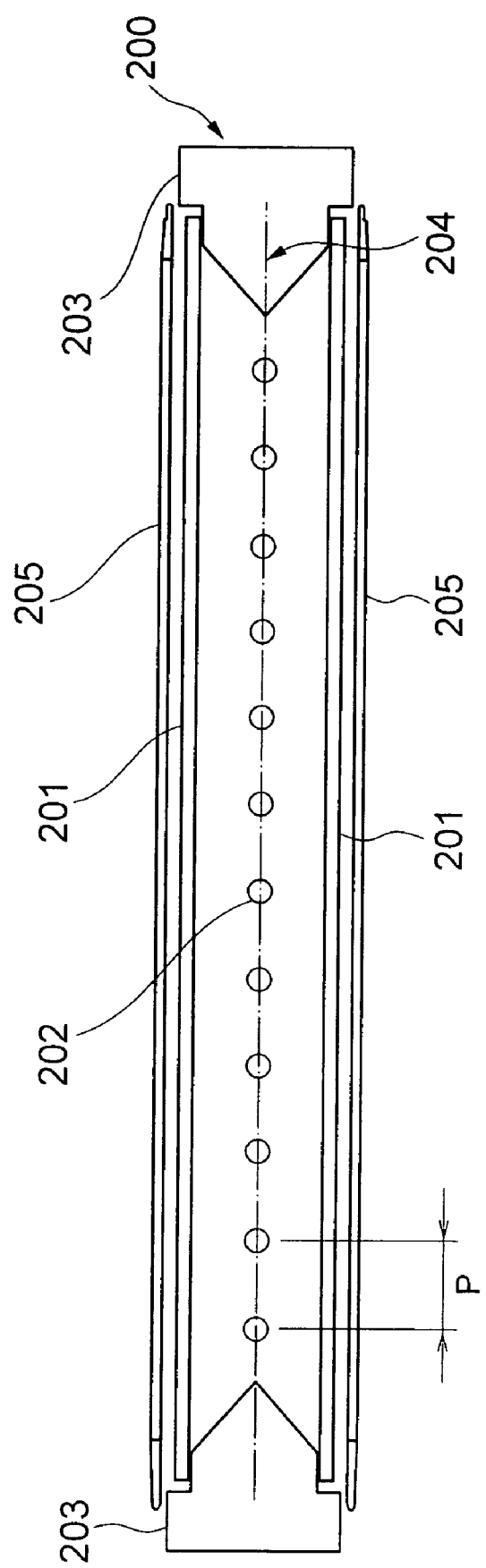
FIG. 7 is a sectional view of a conventional double-sided backlight described in a patent publication.
Figure 8:
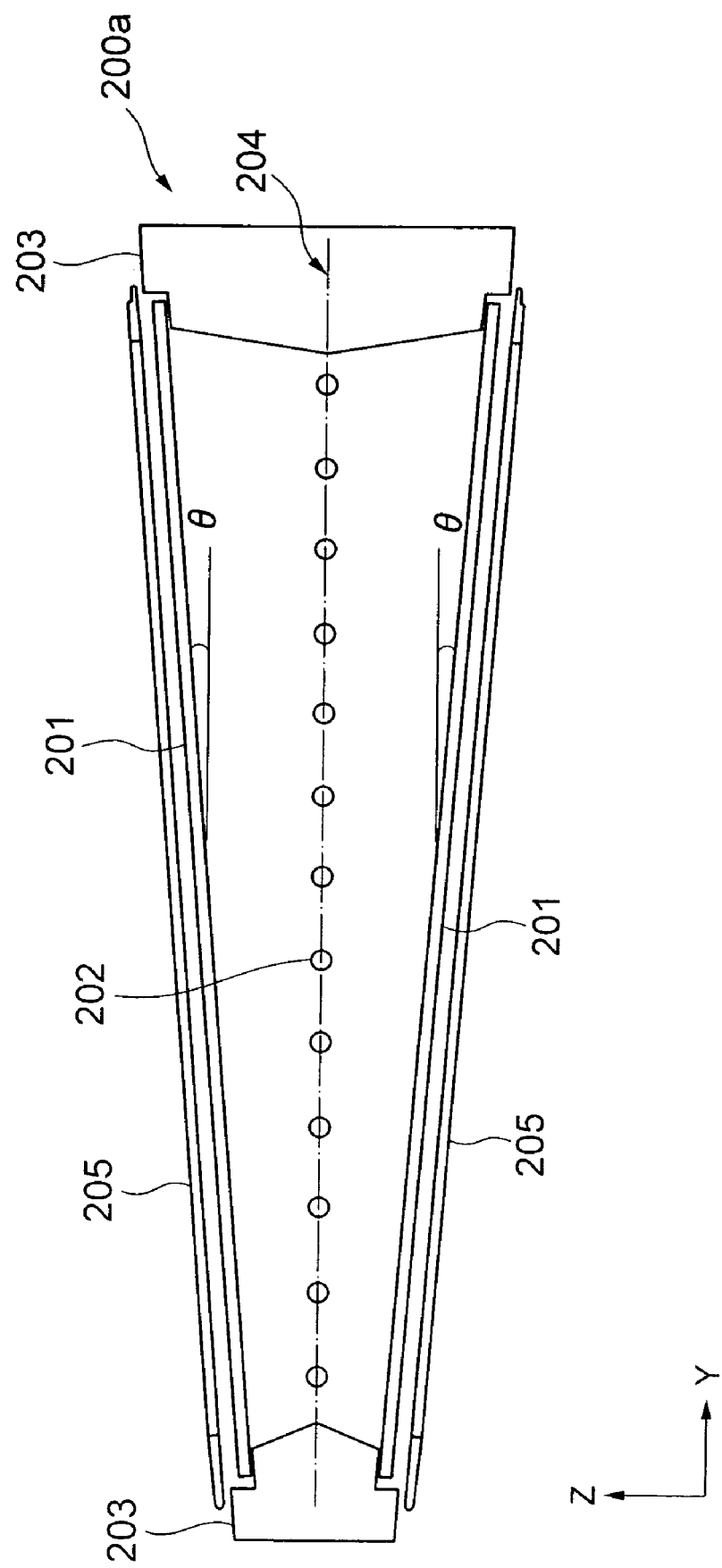
FIG. 8 is a sectional view of a conceivable double-sided backlight unit having inclined emission surfaces.
Figure 9:
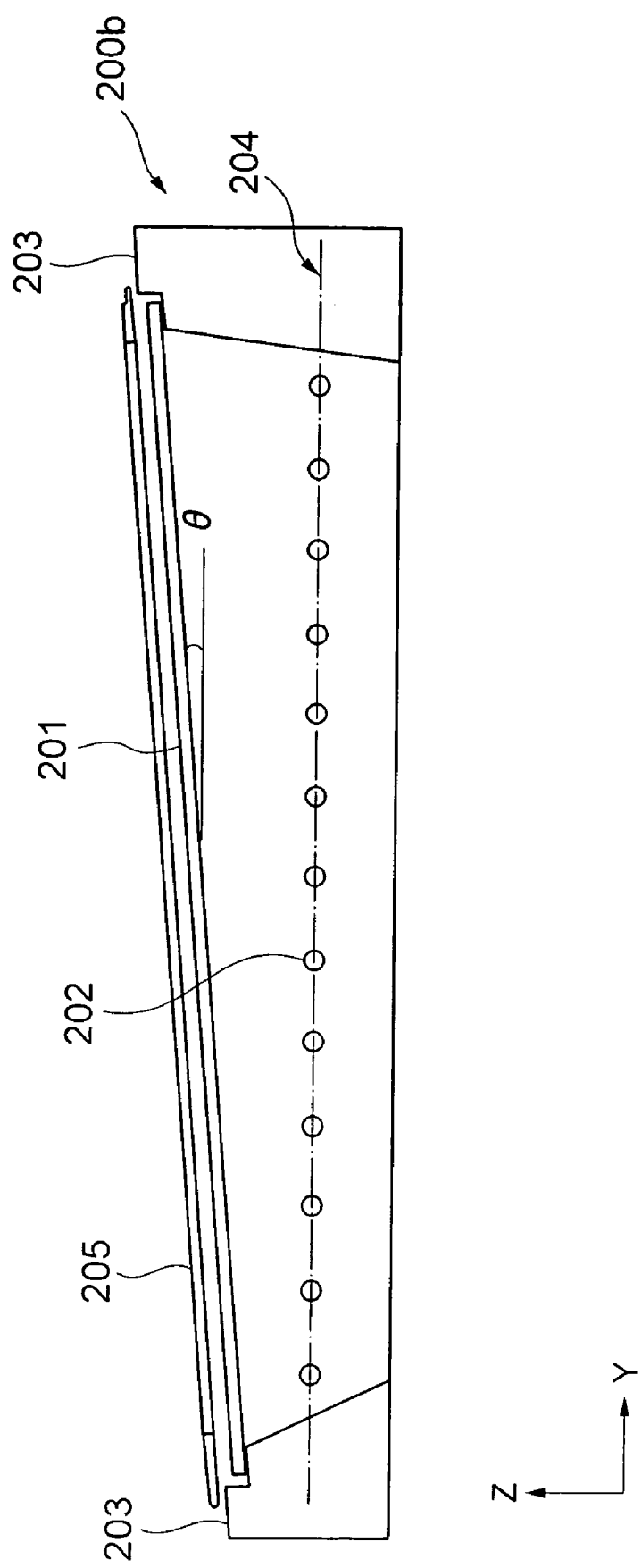
FIG. 9 is a sectional view of a single-sided backlight unit having a problem similar to that in the backlight unit of FIG. 8.

Although the rows of the first through third lamp groups 107a, 107b and 107c are disposed parallel to one another in the second embodiment, both the second and third lamp groups 107g and 107h, as shown in FIG. 6, may be arranged parallel to the respective scattering plates 101 in the area near the large-thickness edge, with the first group 107*a* lying on the central plane 104 in the area near the small-thickness edge.

In the third embodiment, different radiation powers are used by changing the powers based on the distance between the scattering plate 101 and the lamps 102. However, each lamp 102 may be associated with a light shield film adhered thereon or disposed near the lamp 102, instead of employing different radiation powers thereof. Further, instead of or in addition to the use of different radiation powers of the lamps, different brightnesses may be employed on the surfaces of the lamps by employing different diameters of the lamps.

In stead of using a light shield film in the fourth embodiment, the scattering plate 101 itself may be provided with a light shield pattern on the inner surface thereof, or the lamps 102 may be provided with light shield patterns by printing, for example.

The plurality of lamps 102 in the above embodiments need not necessarily be arranged parallel to one another so long as the lamps 102 are disposed behind the light emission surface.

Since the above embodiments are described only for examples, the present invention is not limited to the above embodiments and various modifications or alterations can be easily made therefrom by those skilled in the art without departing from the scope of the present invention.

What is claimed is:

1. A backlight unit comprising a light emission surface, and a plurality of lamps arranged in a radiation plane in a direction inclined with respect to said light emission surface, said plurality of lamps being arranged such that a pitch between each adjacent two of said lamps reduces along a direction in which a distance between said radiation plane and said emission surface increases due to said inclination.

2. The backlight unit according to claim 1, wherein said pitch is determined so that a distance between a center of each of said adjacent two of said lamps and an intersection of said emission surface and a perpendicular bisector dividing a line segment connecting centers of said adjacent two of said lamps in a cross section of said lamps is constant for each said adjacent two of said lamps.

3. The backlight unit according to claim 1, wherein said backlight unit includes a plurality of groups of lamps, each of said groups of lamps constitutes said plurality of lamps, said radiation plane of each of said groups of lamps is deviated from said radiation plane of one another.

4. The backlight unit according to claim 1, wherein said backlight unit comprises a pair of said emission surfaces on front an rear sides thereof.

5. A backlight unit comprising a light emission surface, and a plurality of lamps arranged in a radiation plane in a direction inclined with respect to said light emission surface, said plurality of lamps having radiation powers such that said radiation power increases along a direction in which a distance between said radiation plane and said emission surface increases due to said inclination.

6. The backlight unit according to claim 4, wherein said plurality of lamps are arranged at a constant pitch.

7. The backlight unit according to claim 4, wherein said backlight unit comprises a pair of said emission surfaces on front an rear sides thereof.

8. A backlight unit comprising a light emission surface, a plurality of lamps arranged in a radiation plane in a direction inclined with respect to said light emission surface, and a transmission control film having a transmission control pattern wherein a transmission of said transmission control pattern increases along a direction in which a distance between said radiation plane and said emission surface increases due to said inclination.

9. The backlight unit according to claim 8, wherein said plurality of lamps are arranged at a constant pitch.

10. The backlight unit according to claim 8, wherein said backlight unit comprises a pair of said emission surfaces on front an rear sides thereof.

11. A double-sided display device comprising said backlight unit according to claim 10, and front and rear display panels disposed on respective said emission surfaces.

* * * * *